US012691544B2

(12) United States Patent
Ozeki et al.

(10) Patent No.: US 12,691,544 B2
(45) Date of Patent: Jul. 28, 2026

(54) VIDEO GENERATION DEVICE AND COMPUTER-READABLE STORAGE MEDIUM

(71) Applicant: FANUC CORPORATION, Yamanashi (JP)

(72) Inventors: Shinichi Ozeki, Yamanashi (JP); Nobuaki Aizawa, Yamanashi (JP); Yuuki Sugita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/862,930

(22) PCT Filed: May 13, 2022

(86) PCT No.: PCT/JP2022/020231
§ 371 (c)(1),
(2) Date: Nov. 4, 2024

(87) PCT Pub. No.: WO2023/218643
PCT Pub. Date: Nov. 16, 2023

(65) Prior Publication Data
US 2025/0301206 A1 Sep. 25, 2025

(51) Int. Cl.
*B23Q 17/24* (2006.01)

(52) U.S. Cl.
CPC ................................ *B23Q 17/2409* (2013.01)

(58) Field of Classification Search
CPC ........................ B23Q 17/2409; G05B 23/0221
See application file for complete search history.

(56) References Cited

U.S. PATENT DOCUMENTS

| | | | |
|---|---|---|---|
| 2006/0177119 A1* | 8/2006 | McPheely | G05B 19/4184 |
| | | | 382/141 |
| 2010/0063615 A1 | 3/2010 | Mori et al. | |
| 2015/0009329 A1 | 1/2015 | Ishimoto | |
| 2018/0205905 A1* | 7/2018 | Hammar | G09B 9/042 |
| 2019/0271976 A1 | 9/2019 | Namikoshi | |
| 2021/0381197 A1 | 12/2021 | Otani et al. | |
| 2022/0368850 A1* | 11/2022 | Nada | G06Q 50/04 |

FOREIGN PATENT DOCUMENTS

| | | | |
|---|---|---|---|
| JP | 2001-125612 A | 5/2001 | |
| JP | 2010-061661 A | 3/2010 | |
| JP | 2019-150923 A | 9/2019 | |
| JP | 2020-077173 A | 5/2020 | |
| JP | 2020-175890 A | 10/2020 | |
| WO | WO-2013058093 A1 * | 4/2013 | H04N 7/181 |

* cited by examiner

*Primary Examiner* — Michael Lee
(74) *Attorney, Agent, or Firm* — HAUPTMAN HAM, LLP

(57) ABSTRACT

Provided is a video generation device which generates a recorded video of an industrial machine, acquires data indicating a state of the industrial machine, searches data indicating a state of the industrial machine, detects a trigger event indicating work which the industrial machine has carried out, determines a viewpoint corresponding to the trigger event, and generates video based on the determination of the viewpoint.

7 Claims, 15 Drawing Sheets

100

VIDEO GENERATION DEVICE

1

DATA ACQUISITOR

3

OBSERVING POINT DETERMINATOR

2

VIDEO GENERATOR

DATA

RETRIEVAL

TRIGGER EVENT

OBSERVING POINT

CORRESPONDENCE

| TASK | EVENT SET | | |
| --- | --- | --- | --- |
| | START EVENT | EVENT | TRIGGER EVENT |
| MACHINING (START MACHINING) | PRESS BUTTON FOR CHANGING NC MODE INTO MEM | DISPLAY AUTOMATIC OPERATION SCREEN | PRESS CYCLE START BUTTON |

TOOL

RAPID
TRAVERSE

WORKPIECE COORDINATE
Z-AXIS

WORKPIECE COORDINATE
Y-AXIS

MACHINING
START
POSITION

WORKPIECE COORDINATE
X-AXIS

DISTANCE

WORKPIECE

FIG.12

| TASK | EVENT SET | | | | |
|---|---|---|---|---|---|
| | START EVENT | EVENT | | | TRIGGER EVENT |
| WORKPIECE MEASUREMENT (HOLE DISTANCE MEASUREMENT) | REPLACE WITH TOUCH PROBE | DISPLAY WORKPIECE COORDINATE MEASUREMENT SCREEN | SELECT HOLE DISTANCE MEASUREMENT | AXIS CONTROL BY JOG | TOUCH PROBE COME INTO CONTACT WITH WORKPIECE | DATA SETTING FOR WORKPIECE COORDINATE |

VIDEO GENERATION DEVICE AND COMPUTER-READABLE STORAGE MEDIUM

RELATED APPLICATIONS

The present application is a National Phase of International Application No. PCT/JP2022/020231 filed May 13, 2022.

TECHNICAL FIELD

The present invention relates to a video generation device and a computer-readable storage medium.

BACKGROUND ART

Currently, there is technique for monitoring conditions of an industrial machine to utilize the monitoring result for control efficiency improvement or machine maintenance. Such technique collects data on the industrial machine, and analyzes the collected data to keep track of the conditions of the industrial machine, thereby utilizing the data to prevent a malfunction in the industrial machine, confirming product quality, and improving production management.

An industrial machine and its peripheral machinery detected by sensors are recorded in a data collection device called data logger. In a factory, multiple data loggers are installed to record conditions of machinery in the factory.

Programmable logic controllers (PLCs) for controlling operation sequences of machinery and numerical control devices (numerical controls) for controlling machine tools also have internal recording units, so as to store control information, condition information and others.

Pieces of collected data are converted into a form visible to an operator. Patent Literature 1 discloses that "upon acquisition of control data from a controller, image data from a camera, and sound data from a device to be controlled, time load means creates time-added control data, time-added image data, and time-added sound data by adding times at which the data are respectively acquired, and stores these pieces of data in a temporary file. Then log data creation means reads out a set of time-added control data, time-added image data and time-added sound data, each having the closest time, among from the pieces of time-added control data, time-added image data and time-added sound data stored in the temporary file to create log data including times, control data, image data, and sound data, thereby replaying the data while synchronizing them". According to Patent Literature 1, the images, the sound, and the log of the device to be controlled are replayed by synchronizing them with the time.

Patent Literature 2 discloses that "a camera is connected to the controller to take pictures of a robot, and image data showing the behavior of the robot obtained by taking pictures of the robot is supplied to the controller in a form of electrical signals", and that "when an error (event) occurs, an error record related to the error is created separately from an operation log". According to Patent Literature 2, when the event occurs during taking pictures, the event is recorded in association with the pictures.

PRIOR ART DOCUMENT

Patent Literature

[Patent Literature 1] Japanese Patent Laid-Open Publication No. 2001-125612

[Patent Literature 2] Japanese Patent Laid-Open Publication No. 2019-150923

SUMMARY OF THE INVENTION

Problems to be Solved by the Invention

Patent Literature 1 displays the images and the logs at a time, and Patent Literature 2 records the log (data) when the event occurs. The log and the images during the occurrence of the event can elucidate the circumstances when the error occurs, thereby helping find the cause of the error. Likewise, if images with good visibility are created, such images can be used to improve the maintenance and productivity of industrial machinery.

Thus, there is a problem in improving the visibility in the field of data management of industrial machinery.

Means for Solving the Problem

One aspect of the present disclosure is a video generation device which includes: a data acquisitor for acquiring data indicating a mechanical state of an industrial machine; an observing point determinator for retrieving data indicating the state of the industrial machine, and detects a trigger event indicating a task executed by the industrial machine, so as to determine an observing point corresponding to the trigger event; and a video generator for generating a video of the industrial machine based on the observing point determined by the observing point determinator.

One aspect of the present disclosure is a storage medium which stores instructions readable by one or more processors, the one or more processors executing the instructions to: acquire data indicating a state of an industrial machine; retrieve data indicating the state of the industrial machine, detect a trigger event indicating a task executed by the industrial machine, and determine an observing point corresponding to the trigger event; and generate a video based on the determination about the observing point.

Advantageous Effect of the Invention

One aspect of the present invention can improve the image visibility.

BRIEF DESCRIPTION OF THE DRAWINGS

FIG. 12 shows a trigger event and an event set for workpiece measurement (hole distance measurement);

MODES FOR CARRYING THE INVENTION

Descriptions will now be made about a video generation device 100 that employs the present disclosure. The video generation device 100 is configured to acquire data that indicates a state of an industrial machine arranged in a factory. The video generation device 100 uses data previously accumulated to determine an observing point of a video that shows the operation of the industrial machine. Target industrial machinery includes, but is not limited thereto, machine tools, numerical controllers, and robots.

Figure 1:
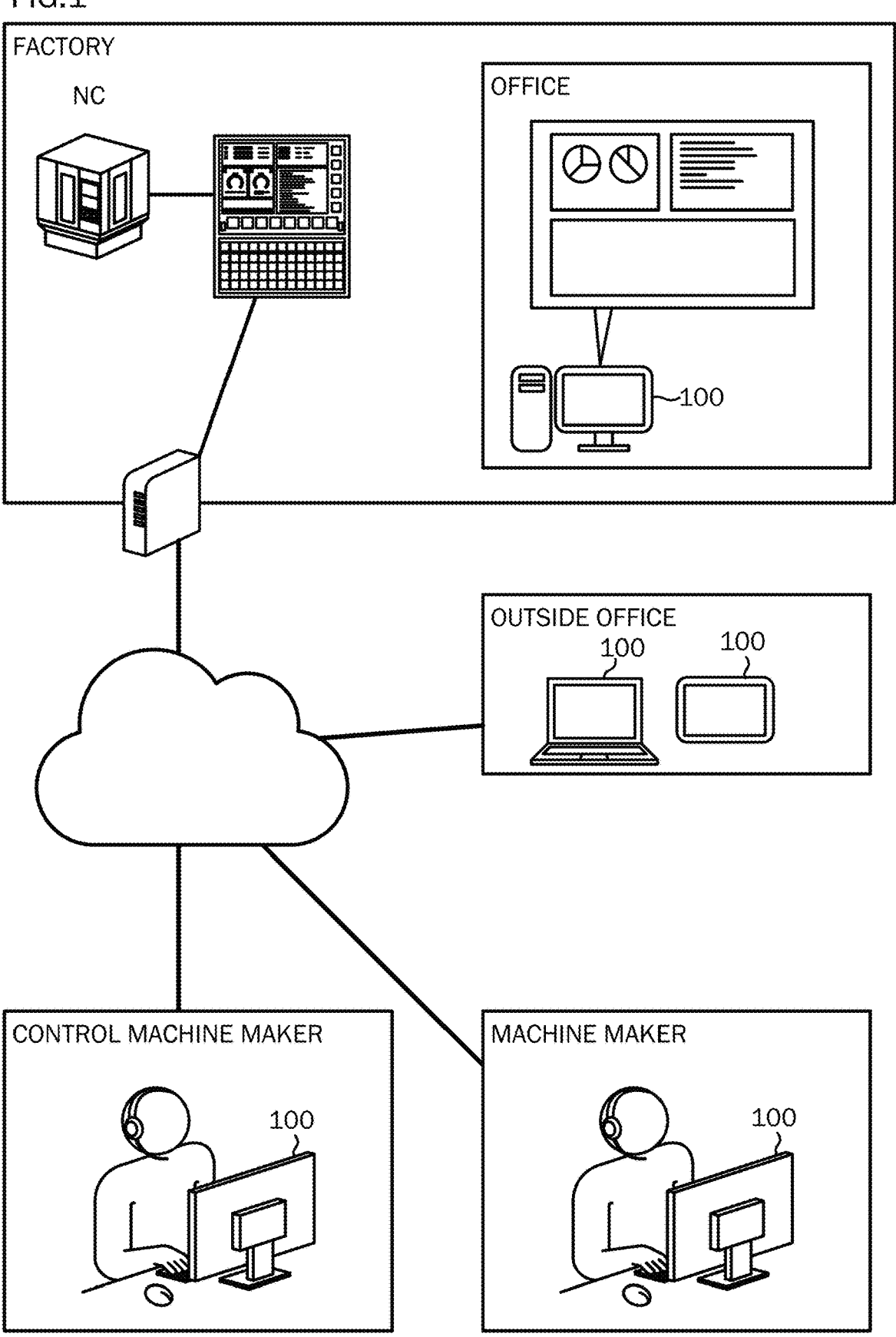
FIG. 1 shows a range of application of a video generation device.

The video generation device 100 is applied to an information processing device, such as a personal computer (PC), server, and mobile terminal. More specifically, as shown in FIG. 1, the video generation device 100 is applied to, but is not limited thereto, a PC used by a factory administrator, a server in the Cloud, a PC used by an operator of a machine maker, a control machine maker or the like, a mobile terminal used by the factory administrator, by way of example. Videos generated by the video generation device 100 is utilized to industrial machine control (e.g. maintenance, manufacturing control).

The video generation device 100 may be also applied to an information processing device, such as a numerical controller, and a programmable logic controller (PLC).

First Disclosure

Figures 2, 3:
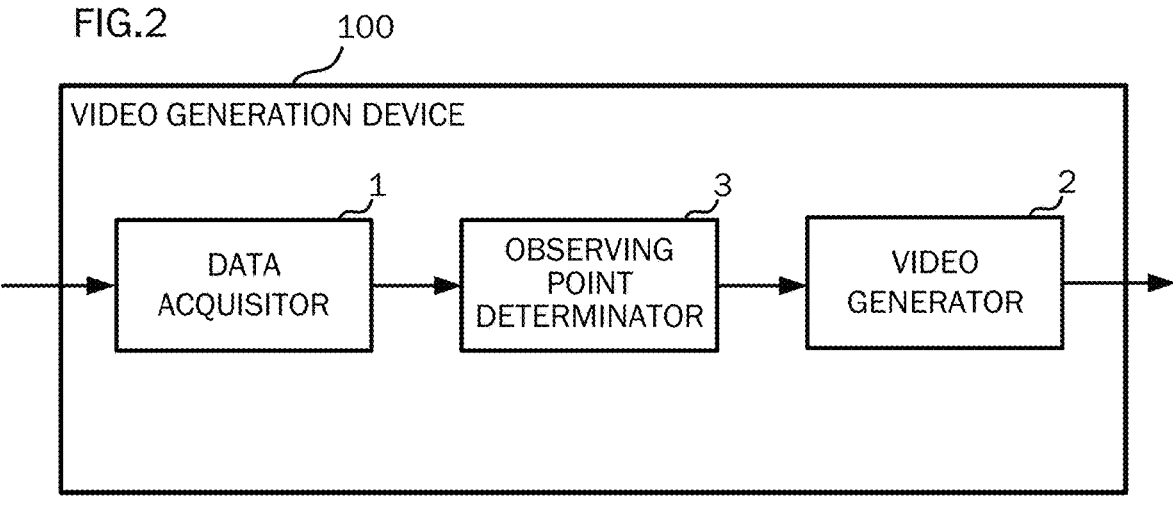
FIG. 2 is a block diagram showing a video generation device according to a first disclosure.
FIG. 3 shows a conceptual model of an observing point determinator in the first disclosure.

FIG. 2 is a block diagram of the video generation device 100 according to a first disclosure. The video generation device 100 includes a data acquisitor 1, a video generator 2, and an observing point determinator 3.

The data acquisitor 1 is configured to acquire data about industrial machines. The data acquired by the data acquisitor 1 includes state information of the industrial machines, operation input information, control information of the industrial machines, and the like.

The present disclosure shows a numerical controller and a machine tool as an example of the industrial machines. The state information of the industrial machines includes the mode of the numerical controller, a tool offset, alarms, times, the number of machined parts, modal information, positional information (coordinate system), power consumption in the machine tool, the load on a servo motor, measurement data obtained by sensors (such as temperature and pressure), for instance. The operation input information is operation input conducted by an operator into a touch panel, a button, a dial, a handle and the like.

The video generator 2 is configured to generate a simulation video showing the operations of the industrial machines by employing a conventional simulation technique. An observing point of the simulation video can be changed. Although the present disclosure shows an example of generating the simulation video, the video generated by the video generator 2 may be a two-dimensional image based on a result obtained from the observing point determinator 3, instead of the simulation video.

The observing point determinator 3 is configured to determine an observing point of the simulation video generated by the video generator 2. FIG. 3 shows a conceptual model of the observing point determinator 3. The observing point determinator 3 monitors the data acquired by the data acquisitor 1 and then detects a trigger event. The observing point determinator 3 determines an observing point corresponding to the detected trigger event. An embodiment of the trigger event will be described later.

The video generator 2 generates a simulation video from the observing point determined by the observing point determinator 3. Instead of the simulation video, a two-dimensional image may be generated based on the result obtained by the observing point determinator 3. This creates a recorded video from an observing point suitable for checking the operation of the industrial machine.

As described above, the video generation device 100 of the first disclosure acquires the data about the industrial machines, detects the trigger event, and generates the recorded video from the observing point suitable for checking the operation of the industrial machine. According to this disclosure, the observing point of the video can be changed according to a task of the industrial machine to generate a video with high visibility.

Second Disclosure

Figure 4:
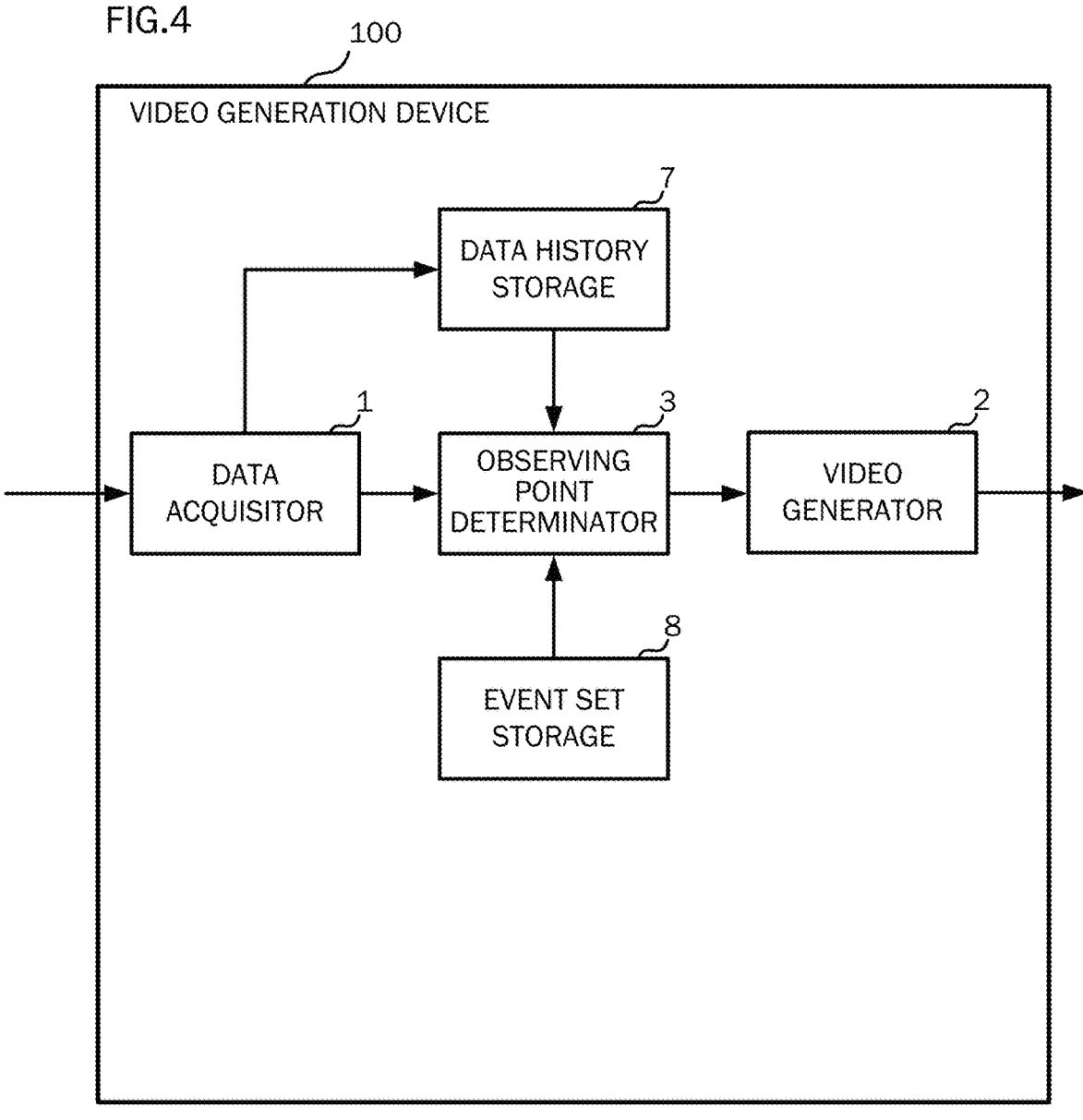
FIG. 4 is a block diagram showing a video generation device according to a second disclosure.

FIG. 4 is a block diagram of the video generation device 100 according to a second disclosure. The video generation device 100 includes a data acquisitor 1, a video generator 2, a data history storage 7, an observing point determinator 3, and an event set storage 8.

The video generation device 100 of the second disclosure includes the data history storage 7 and the event set storage 8. The data history storage 7 is configured to store data histories acquired by the data acquisitor 1. The event set storage 8 is configured to store a combination of data (event set) that appears when conducting tasks.

Figure 5:
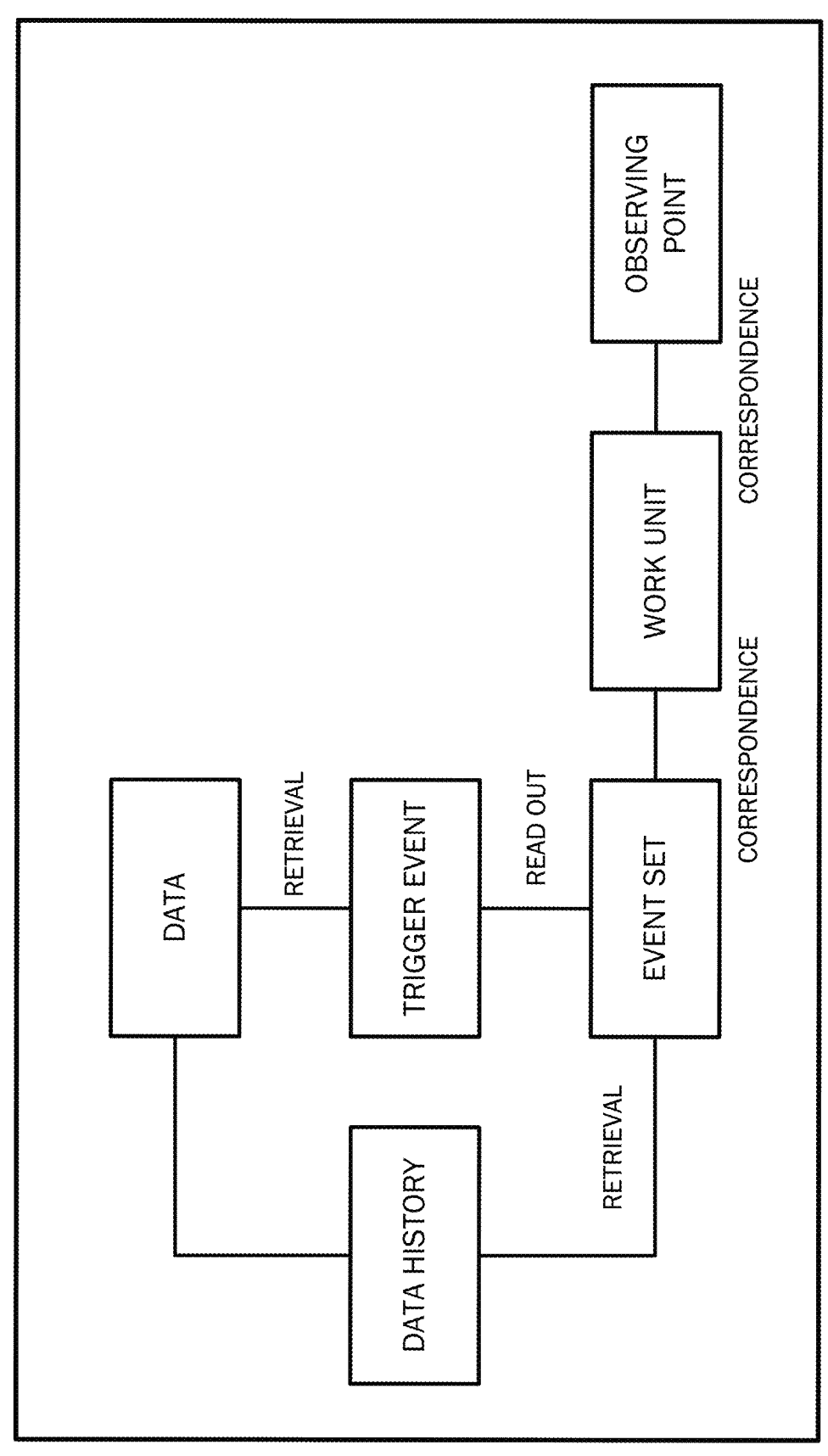
FIG. 5 shows a conceptual model of an observing point determinator in the second disclosure.

FIG. 5 shows a conceptual model of the observing point determinator 3. The observing point determinator 3 retrieves data acquired by the data acquisitor 1 to detect a trigger event. The observing point determinator 3 reads an event set corresponding to the detected trigger event, and then retrieves historical data stored in the data history storage 7 so as to find out if the event set corresponding to the detected trigger event has appeared in the past. When any event set corresponding to the detected trigger event has been appeared, it is determined that a task has been conducted in the past.

The event set corresponds to work units from the start to the end of a task. In this disclosure, an event that occurs at the start of the task is named a start event. One work unit is from the start event to a trigger event. An embodiment of the event set will be described later.

The video generator 2 generates a video based on the result obtained by the observing point determinator 3.

The time at which the event occurred may be added to the video generated by the video generator 2. This time can be used to create a seek bar or merge with other videos, as will be described later.

As described above, the video generation device 100 of the second disclosure determines the observing point according to whether or not the events (the trigger event and the event set) associated with the task have occurred. The video generation device 100 generates a simulation video based on the determined observing point. By changing the observing points, a video with high visibility can be generated.

Embodiment of Second Disclosure

An embodiment of the video generation device 100 of the second disclosure will now be described. This embodiment will be described by limiting events to operation signals from an operator and screen displays.

Figure 6:
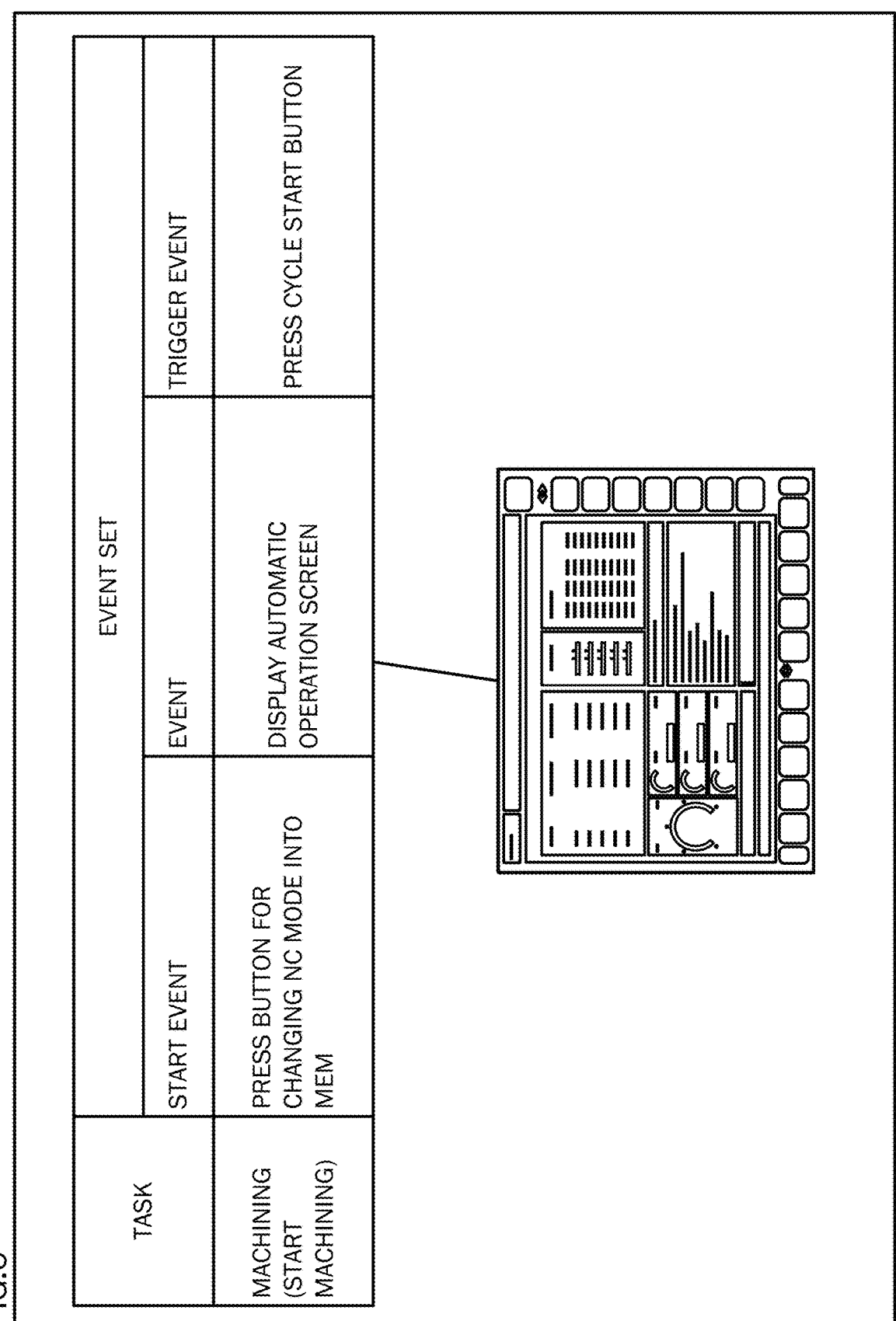
FIG. 6 shows an example of an event set.
Figure 11:
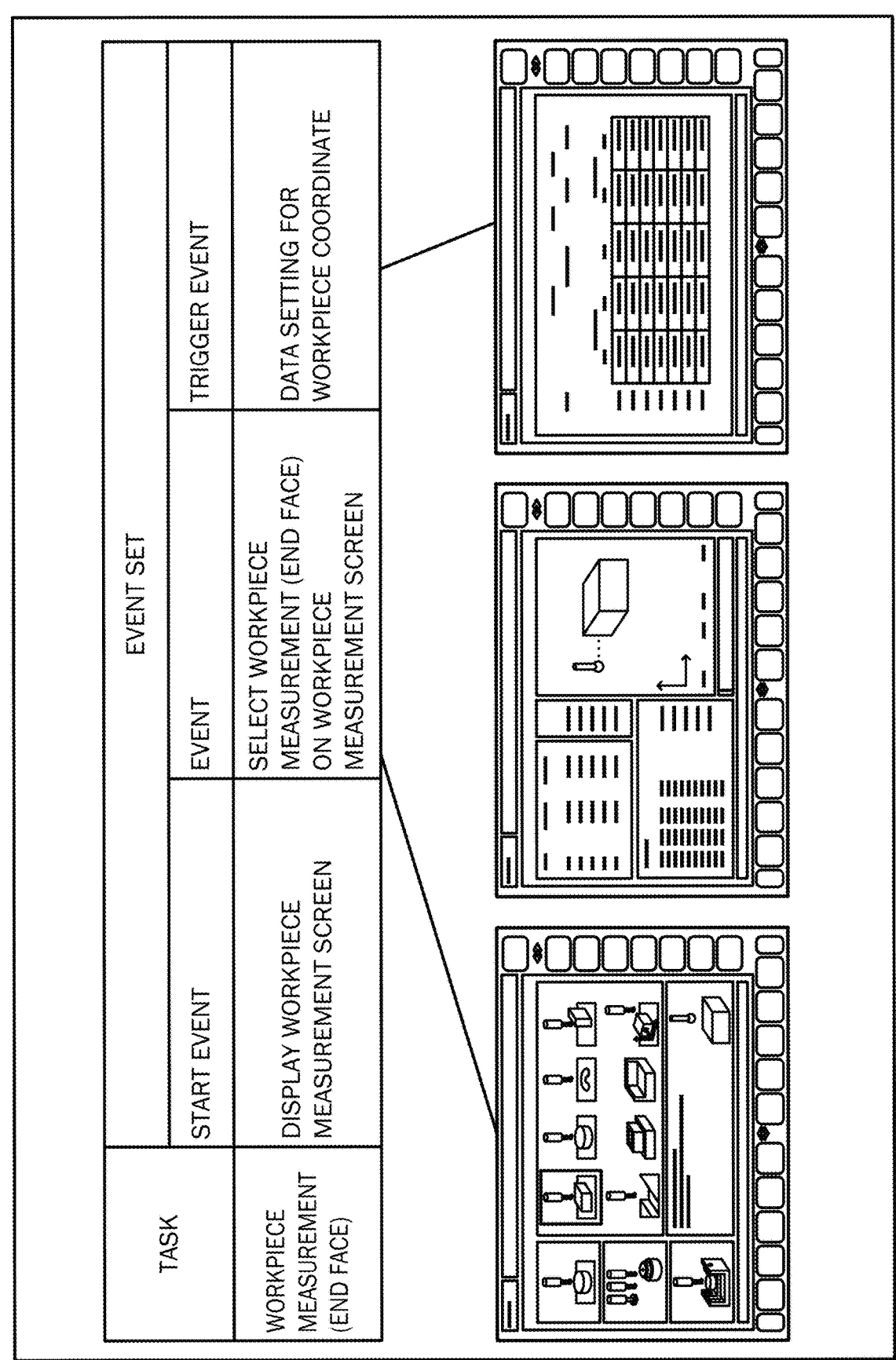
FIG. 11 shows a trigger event and an event set for workpiece measurement task (end face)

With reference to FIGS. 6, 11 and 12, descriptions will be made about the change in the observing point in a numerical controller which controls machine tools.

The descriptions are made based on the premise that the observing point determinator 3 retrieves a trigger event from data acquired by the data acquisitor 1.

Assuming that the observing point determinator 3 detects a trigger event "Press cycle start button". FIG. 6 shows an example of an event set. In FIG. 6, the trigger event "Press cycle start button" is tied to an event set consisting of three events, i.e., "Press button for changing NC mode to MEM", "Display automatic operation screen" and "Press cycle start button".

Of the three events, the event "Press button for changing NC mode to MEM" is the start event. When the events "Display automatic operation screen" and "Press cycle start button" are executed in order from the start event, it can be recognized that a work unit "Start machining" is executed.

The observing point determinator 3 detects the events "Press cycle start button" and "Press button for changing NC mode to MEM" from an operation signal. The event "Display automatic operation screen" can be detected from an item "Screen ID" which is included in the history of the operation signal. The item "Screen ID" is an ID assigned to each screen. It can be detected from the item "Screen ID" that an item "Automatic operation screen" is displayed. When the events are executed in the order defined by the event set, the observing point determinator 3 determines that the task "Start machining" is executed.

The order in which the events occur is fixed in the above descriptions, but the events may occur in no particular order.

As a preparation before starting machining, a tool is moved in rapid traverse to a machining start position. In a case where machining is conducted by using a new machining program that has not been employed before, the tool is normally paused at the machining start position or slowed down by a feedrate override operation on an operator's panel of the industrial machine. This is because if the distance between a workpiece and the tool is the expected distance at the machining start position, it can be determined that the "machining program" created by a programmer and setting values of "Tool offset" and "workpiece coordinate setting" set at a machining site are correct.

In the task conducted before starting machining, a video that facilitates visibility of the distance between the workpiece and the tool is useful.

The suitable observing point changes depends on the type of the machine tool and the direction of tool movement.

Figure 7:
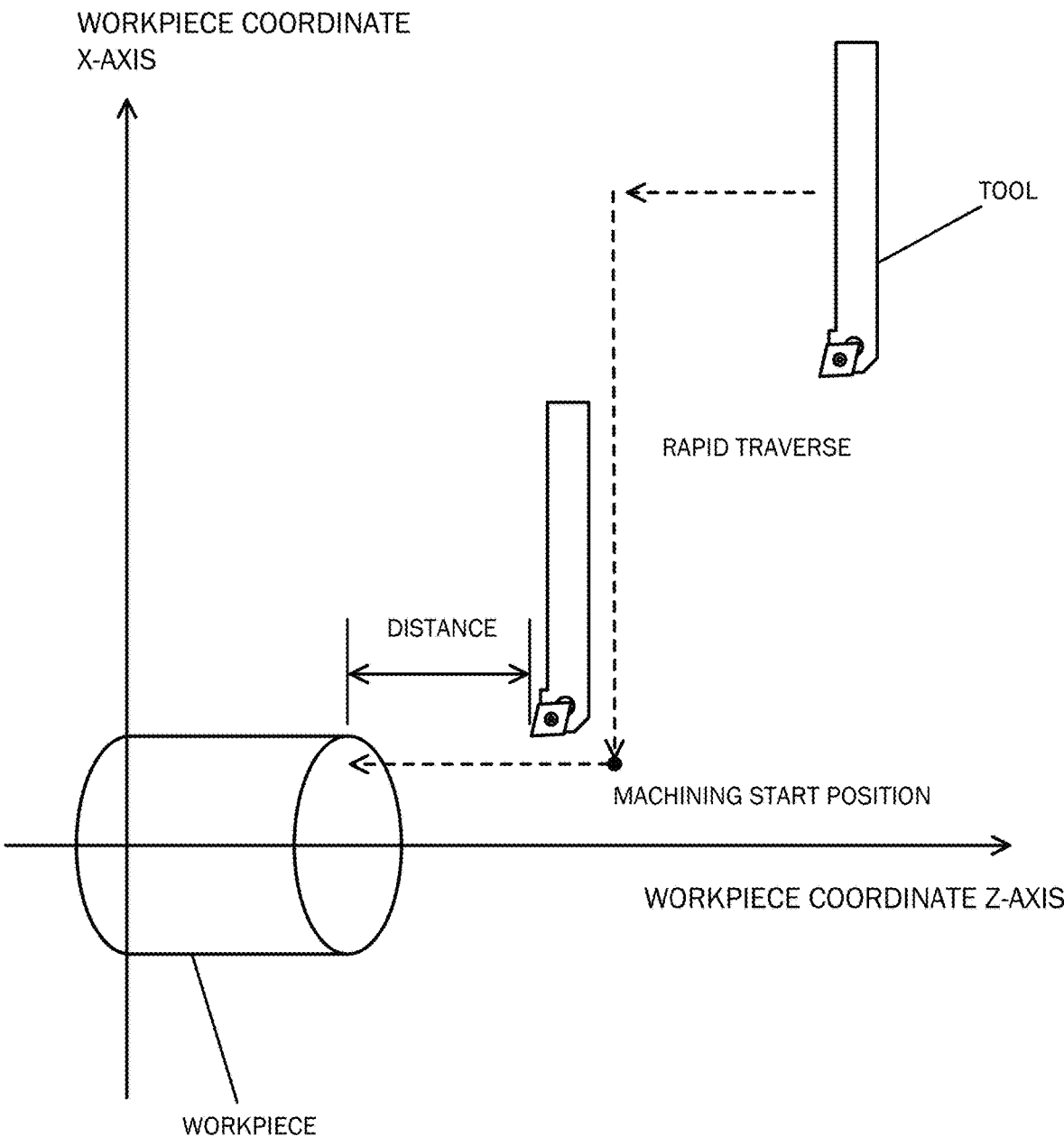
FIG. 7 shows an example of a task before starting machining on a lathe.

FIG. 7 shows an example of a lathe.

In the lathe, the direction parallel to the rotary axis of a spindle is generally the z-axis, and with the z-axis as the middle finger, the direction that is the thumb in the right-hand Cartesian coordinate system is the x-axis. In order to check the distance between the tool and the workpiece before starting cutting, the observing point should be perpendicular to the XZ plane.

Figure 8:
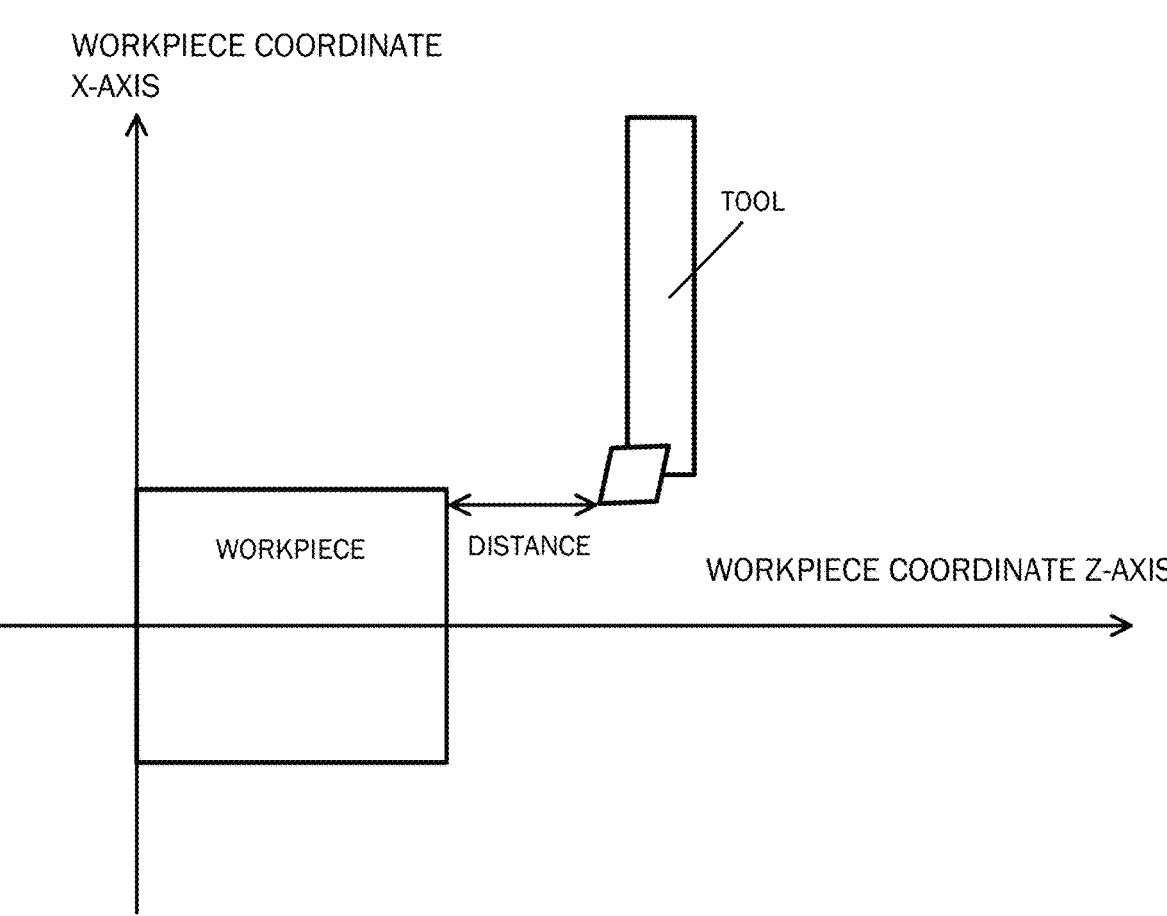
FIG. 8 shows an example of video generated by a video generator.

FIG. 8 shows a video generated from the observing point perpendicular to the XZ plane. By changing the observing point, the distance between the workpiece and the tool is easily visible. The video shown in FIG. 8 is a two-dimensional image based on the result obtained by the observing point determinator 3.

Figure 9:
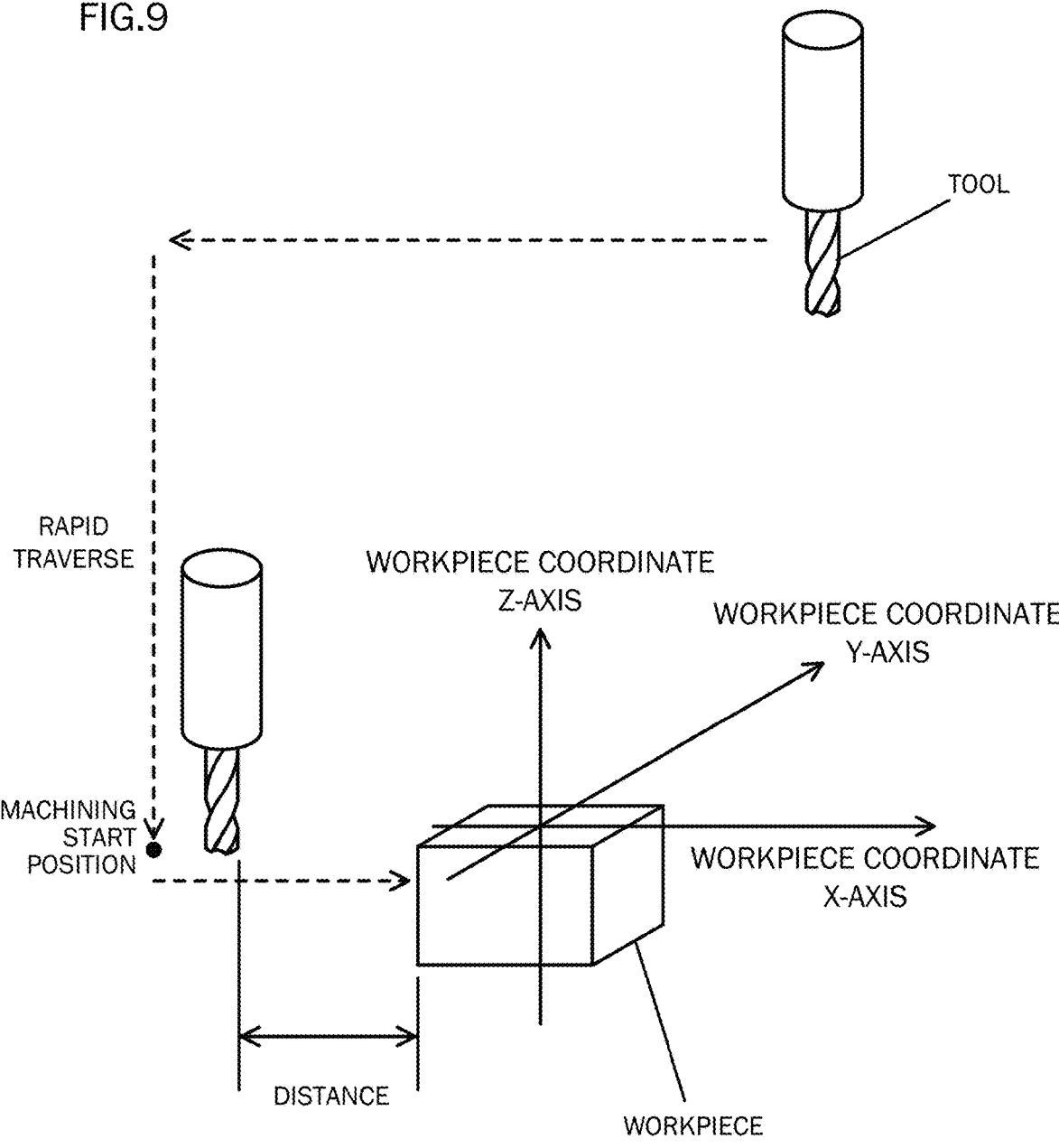
FIG. 9 shows an example of a task before starting machining in a machining center.

FIG. 9 shows an example of a machining center.

Also in the machining center, the tool is moved in rapid traverse to a cutting start position, and is then "paused" or "decelerated". In this embodiment, the tool that starts cutting is moved parallel to the x-axis of the coordinate system of the workpiece. In the example, the distance between the tool and the workpiece can be checked easily at an observing point perpendicular to the XZ plane.

Figure 10:
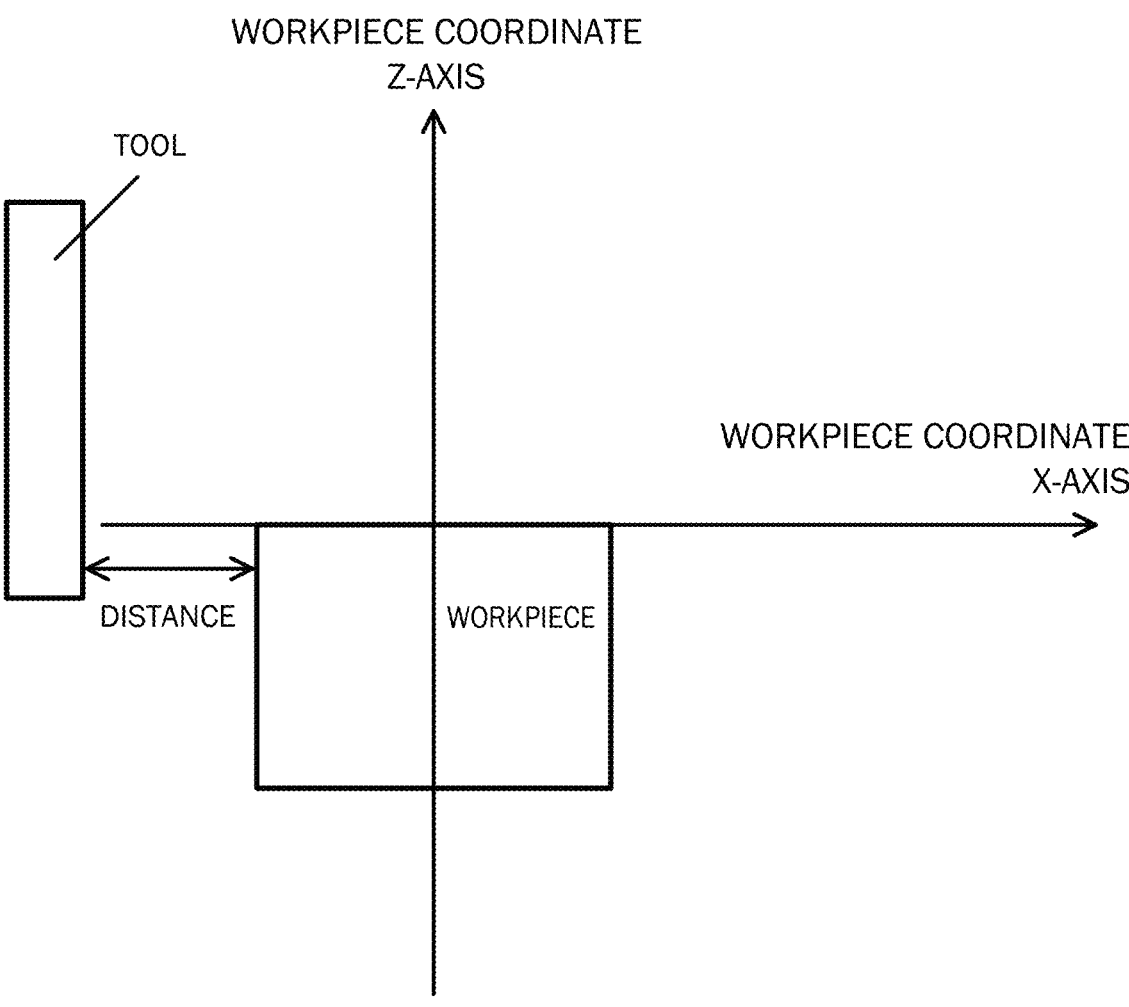
FIG. 10 shows an example of the video generated by the video generator.

FIG. 10 shows a video generated at the observing point perpendicular to the XZ plane. By changing the observing point, the distance between the workpiece and the tool can be visualized easily. The video shown in FIG. 10 is a two-dimensional image created based on the result obtained by the observing point determinator 3.

The observing point determinator 3 may analyze the machining program so as to determine the observing point based on the direction of tool movement.

FIG. 11 shows a trigger event and an event set in a workpiece measurement task (end face). The trigger event in the workpiece measurement task (end face) is "Data setting for workpiece coordinate". The trigger event "Data setting for workpiece coordinate" is tied to an event set that consists of three events, namely "Display workpiece measurement screen", "Select workpiece measurement (end face) on workpiece measurement screen" and "Data setting for workpiece coordinate".

Of the three events, the event "Display workpiece measurement screen" is the start event. When the events "Select workpiece measurement (end face) on workpiece measurement screen" and "Data setting for workpiece coordinate" are executed in order from the start event, it can be recognized that a work unit "Start workpiece measurement (end face)" is executed.

The observing point determinator 3 retrieves the data acquired by the data acquisitor 1 to detect data indicating the occurrence of the event set.

Next, descriptions will be made about a method for identifying the work unit by retrieving the events by going backward in time starting from the trigger event.

FIG. 12 shows a trigger event and an event set for work measurement (hole distance measurement). The trigger event in FIG. 12 is the event "Data setting for workpiece coordinate". The trigger event "Data setting for workpiece coordinate" is tied to an event set that consists of six events, i.e., "Replace with touch probe", "Display workpiece coordinate measurement screen", "Select hole distance measurement", "Manipulate axis by jog", "Touch probe come into contact with workpiece", and "Data setting for workpiece coordinate".

The trigger event "Data setting for workpiece coordinate" in FIG. 12 is similar to the trigger event of the work unit "Workpiece measurement (end face)" in FIG. 11. That is to say, a plurality of event sets may correspond to a single trigger event. In such a case, if the events are retrieved by going backward in time starting from the trigger event, the events will conclusively converge to a single event set (work unit).

Figure 13:
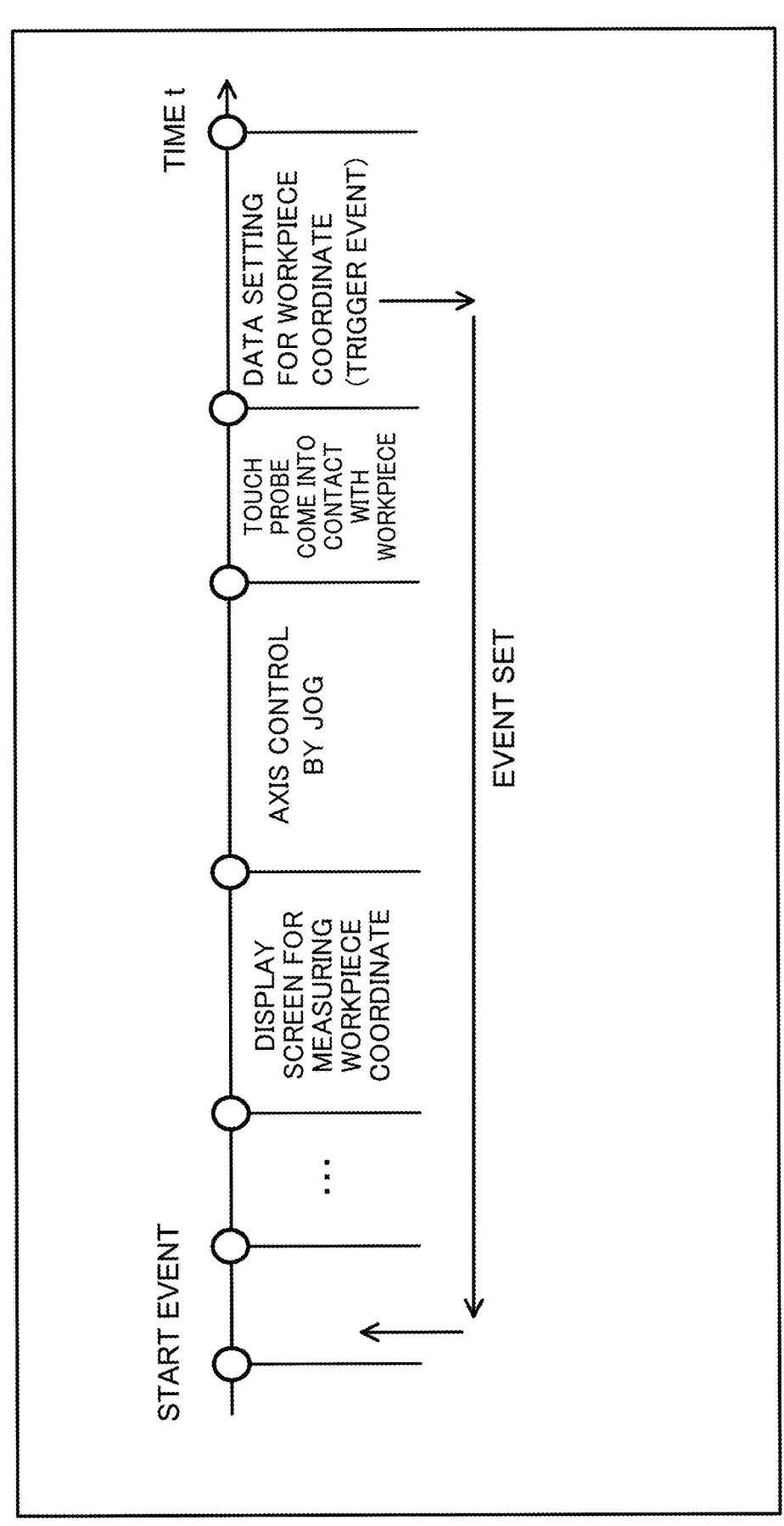
FIG. 13 shows a method for retrieving the event set.

FIG. 13 shows a specific example. When the trigger event "Data setting for workpiece coordinate" is detected, the immediately preceding event "Touch probe come into contact with workpiece" is retrieved. When the event "Touch probe come into contact with workpiece" exists, the immediately preceding event "Manipulate axis by jog" is retrieved. If the event "Touch probe come into contact with workpiece" does not exist, the event included in another event set (e.g. shown FIG. 11) is retrieved. When retrieving the event by going backward in time and reaching the start event, a work unit that corresponds to the event set is determined.

Figure 14:
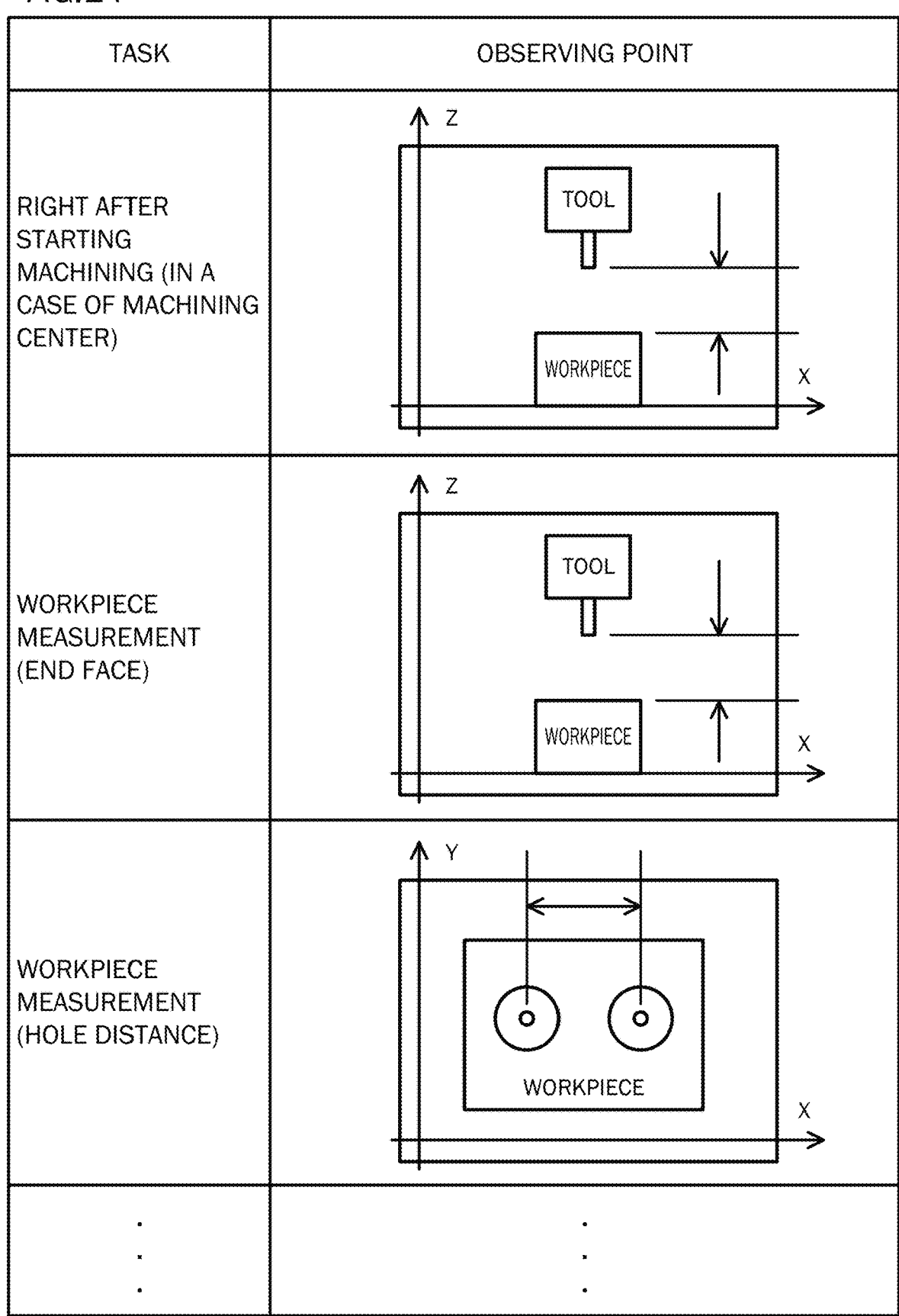
FIG. 14 shows a relationship between a work unit and a viewpoint.

Once the work unit is determined, the observing point is determined. FIG. 14 shows the relationship between the work unit and the observing point. For the task "Start machining" (machining center), the observing point is determined such that the workpiece and the tool are viewed from the side with the z-axis being the vertical axis. For the task "Workpiece measurement (end face)", the observing point is determined such that the workpiece and the tool are viewed from the side with the z-axis being the vertical axis. For the task "Workpiece measurement (hole distance measurement)", the observing point is determined such that the workpiece and the tool are viewed from above with the z-axis being the vertical axis.

The observing point can be defined according to the direction and the distance to an object. For example, the observing point may be selected from predefined directions and distances viewed from a tool and a workpiece. Alternatively, a direction and a distance with no obstruction in the view to the object may be calculated through simulation to thereby automatically determine the observing point.

Figure 15:
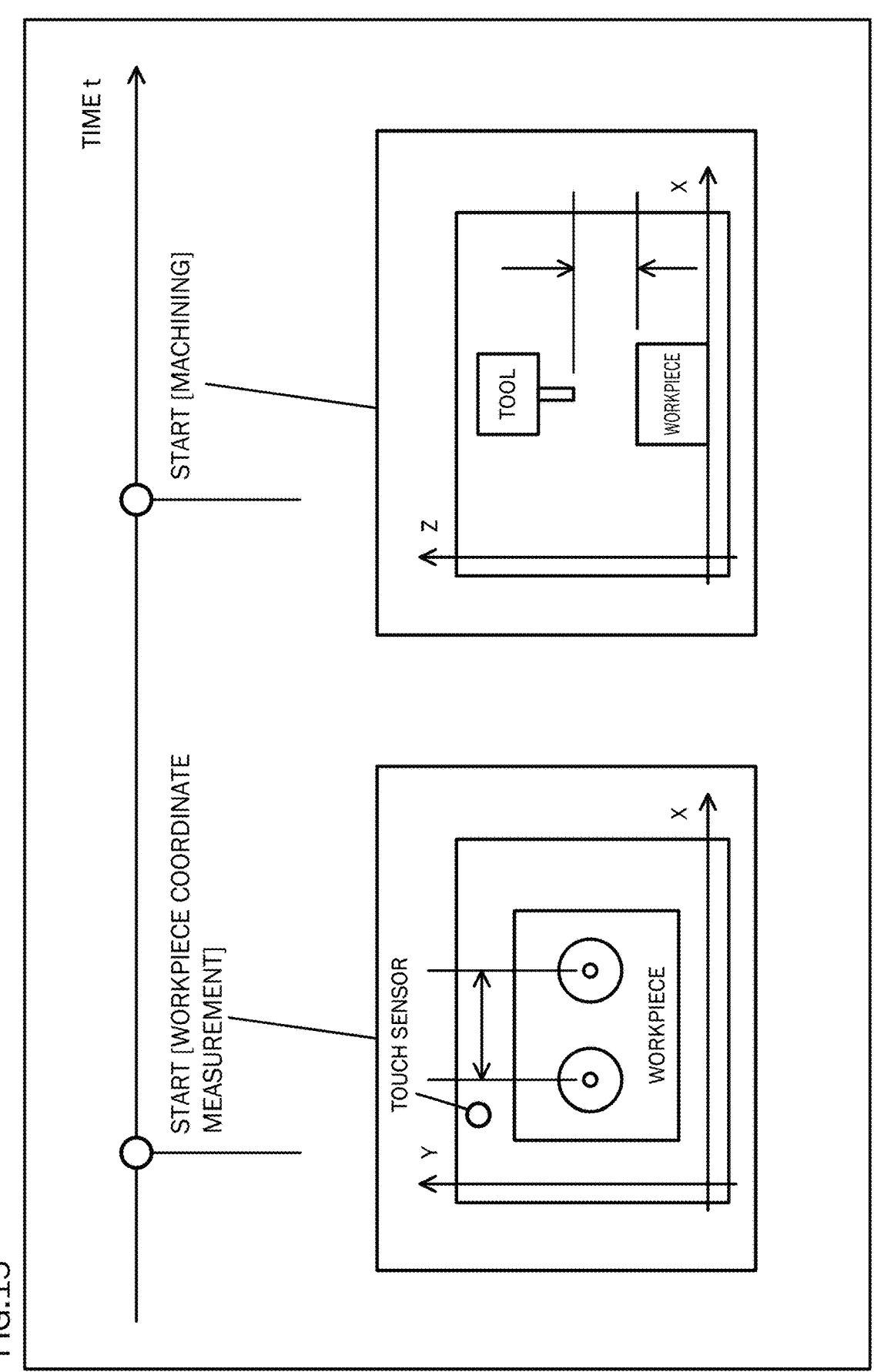
FIG. 15 shows an example of a seek bar with the work unit assigned on the temporal axis.

When the work unit is assigned on a time axis, a seek bar for a video can be created, as shown in FIG. 15. The creation of the seek bar enables the confirmation of the overall workflow, thereby increasing the visibility of the data.

The seek bar for the video can also be created by assigning a time of an event occurrence on the time axis. The creation of the seek bar not only enables the grasp of the workflow in the visual way, but it also enables the check of the task by text in addition to the video. Thus, the visibility of the data is increased.

Third Disclosure

Figure 16:
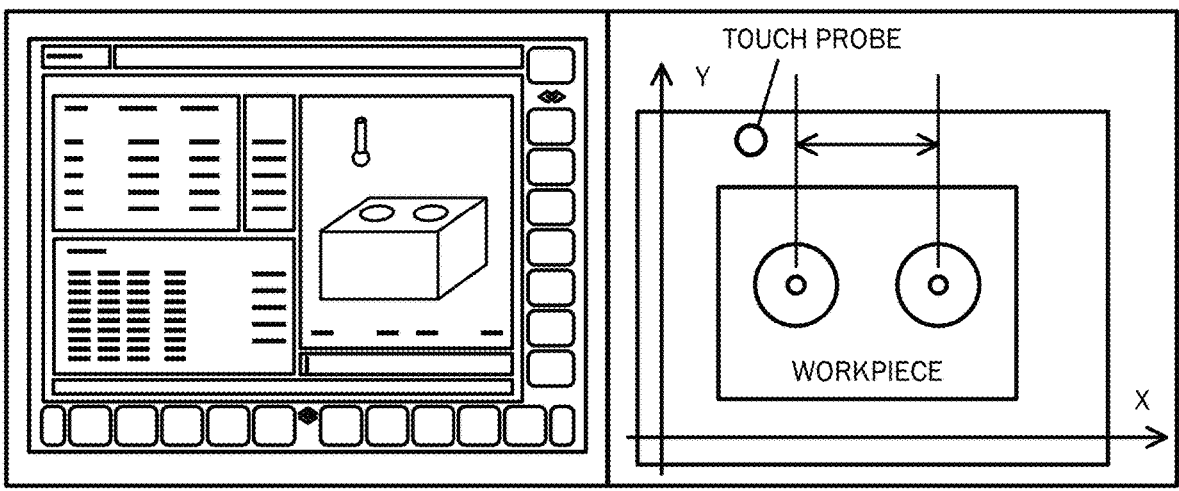
FIG. 16 shows an example combining two videos into one.

According to a third disclosure, a video on the display screen of the numerical controller and a video generated by the video generator 2 are displayed side by side. FIG. 16 shows an example in which the video on the display screen of the numerical controller and the video generated by the video generator 2 are displayed side by side. The video generation device 100 merges the video on the display screen of the numerical controller with the generated video according to times, and generates a video by combining two videos synchronized based on the times.

The example in FIG. 16 shows the video on the display screen of the numerical controller and the video generated by the video generator 2 side by side. The video on the display screen may be captured instead of being photographed by a camera. By displaying the video on the display screen and a simulation video side by side, the operation by the operator and the states of the industrial machines can be checked simultaneously.

Figure 17:
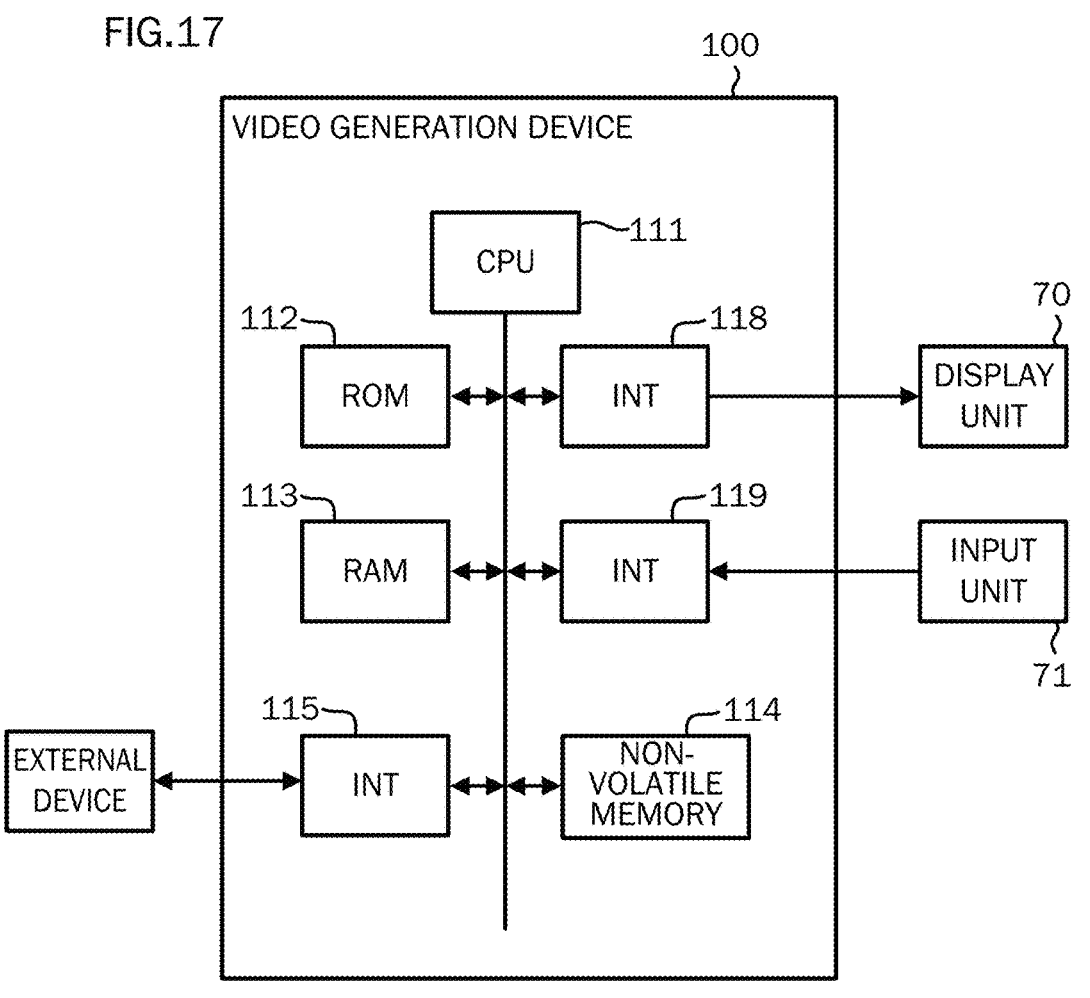
FIG. 17 shows a hardware configuration of the video generation device.

Now, a hardware configuration of the video generation device 100 employing the present disclosure will be described. FIG. 17 shows a hardware configuration of the video generation device 100. The video generation device

100 includes, as shown in FIG. 17, a central processing unit (CPU) 111 for controlling the entire vide generation device 100, a read-only memory (ROM) 112 that stores programs and pieces of data, and a random-access memory (RAM) 113 for temporarily deploying data. The CPU 111 reads a system program stored in the ROM 112 via a bus to control the entire video generation device 100 according to the system program.

A non-volatile memory 114 is backed up by a battery not shown, for example, so that storage conditions can be retained even when a power source of the video generation device 100 is turned off. The non-volatile memory 114 is configured to store, for instance, programs read from external devices via interfaces 115, 118, 119 and various data entered by a user operation via an input unit 71.

The interface 115 mediates the connection between the video generation device 100 and the external devices, such as adaptors. From the external devices, programs, various parameters and others are read out.

REFERENCE NUMERALS LIST

100 Video Generation Device
1 Data Acquisitor
2 Video Generator
3 Observing Point Determinator
7 Data History Storage
8 Event Set Storage
111 CPU
113 RAM
114 Non-Volatile Memory

The invention claimed is:

1. A video generation device, comprising:
a data acquisitor for acquiring data indicating a mechanical state of an industrial machine;
an observing point determinator for retrieving data indicating a state of the industrial machine, detecting a trigger event indicating a task executed by the industrial machine, and determining an observing point corresponding to the trigger event; and
a video generator for generating a simulation video indicating an operation of the industrial machine based on the observing point determined by the observing point determinator.

2. The video generation device according to claim 1, further comprising a data history storage for storing a history of the data acquired by the data acquisitor,
wherein
the observing point determinator stores an event set formed by a combination of a plurality of events, and
the observing point determinator is configured to,
in response to the trigger event being detected, check the data history storage for existence of data indicating occurrence of the plurality of events included in the event set, and
in response to the data indicating the occurrence of the plurality of events included in the event set existing in the data history storage, determine a work unit corresponding to the event set to thereby determine an observing point corresponding to the work unit.

3. The video generation device according to claim 1, wherein the observing point determinator is configured to retrieve data indicating occurrence of a plurality of events included in an event set by going backward in time starting from the trigger event.

4. The video generation device according to claim 2, wherein times of the occurrence of the plurality of events are added to the simulation video generated by the video generator.

5. The video generation device according to claim 2, wherein a seek bar that indicates times of the occurrence of the plurality of events included in the event set is created.

6. The video generation device according to claim 2, wherein a seek bar that indicates a time of an occurrence of the work unit is created.

7. A non-transitory, computer-readable storage medium that stores instructions for causing, when executed by one or more processors, the one or more processors to:

acquire data indicating a state of an industrial machine;

retrieve data indicating the state of the industrial machine, detect a trigger event indicating a task executed by the industrial machine, and determine an observing point corresponding to the trigger event; and generate a simulation video indicating an operation of the industrial machine based on a determination about the observing point.

\*   \*   \*   \*   \*